(12) United States Patent
Xiao et al.

(10) Patent No.: US 10,860,589 B2
(45) Date of Patent: Dec. 8, 2020

(54) RANKING FEED BASED ON A LIKELIHOOD OF A USER POSTING ORIGINAL BROADCAST STORY IN A SESSION

(71) Applicant: Facebook, Inc., Menlo Park, CA (US)

(72) Inventors: Zigang Xiao, Fremont, CA (US); Jie Xu, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 370 days.

(21) Appl. No.: 15/818,739

(22) Filed: Nov. 21, 2017

(65) Prior Publication Data

US 2019/0155914 A1    May 23, 2019

(51) Int. Cl.
```
G06F 16/30       (2019.01)
G06F 16/2457     (2019.01)
G06N 20/00       (2019.01)
G06F 16/248      (2019.01)
G06F 16/9535     (2019.01)
```

(52) U.S. Cl.
CPC ...... *G06F 16/24578* (2019.01); *G06F 16/248* (2019.01); *G06F 16/24575* (2019.01); *G06F 16/9535* (2019.01); *G06N 20/00* (2019.01)

(58) Field of Classification Search
CPC .................... G06F 16/24578; G06F 16/24575
USPC ........ 707/609, 687, 705, 769, 790, 813, 821
See application file for complete search history.

(56) References Cited

U.S. PATENT DOCUMENTS

2016/0055160 A1*  2/2016  Himel ................ G06F 16/248
                                                      707/728
2018/0197109 A1*  7/2018  Taylor ................ G06N 20/00

* cited by examiner

*Primary Examiner* — Sana A Al-Hashemi
(74) *Attorney, Agent, or Firm* — Fenwick & West LLP

(57) ABSTRACT

To maintain user interest, the social networking system determines whether a particular user is interested in posting original broadcast feed stories to the social networking system during a session. Specifically, the social networking system determines a likelihood of a user posting an original broadcast feed story during the session. If the likelihood of the user posting an original broadcast feed story is above a threshold, the social networking system may encourage the user to post an original broadcast feed story by displaying original broadcast feed stories posted by other users to the user in a feed provided to the user. Specifically, the feed may contain more original broadcast feed stories posted by other users or the original broadcast feed stories posted by other users may be ranked higher in the feed than a feed provided to the user if the likelihood was below the threshold.

20 Claims, 5 Drawing Sheets

RANKING FEED BASED ON A LIKELIHOOD OF A USER POSTING ORIGINAL BROADCAST STORY IN A SESSION

BACKGROUND

This invention relates to ranking feed stories in a feed sent to client devices of users by a social networking system and, in particular, to ranking feed stories based on a likelihood of a user posting an original broadcast feed story in a session.

Social network systems receive content from content providers as well as users of the social networking system and provide the received content to users. For example, content may be provided as feed stories in a feed to users. The social networking system provides interesting and relevant content to users using content that the social networking system receives from users. For example, the social networking system provides news feed stories to a user based on content provided by connections of the user, such as texts posted by the connections, images posted by connections, or new videos posted by the connections. Such content is typically posted by users for access by multiple other users. For example, a broadcast post on the user's timeline may be accessible to all connections of the user. If very few users provide original content to the social networking system, the social networking system will have very little content to provide to the users. As a result, the social networking system will provide poor user experience and will lose its user base.

SUMMARY

A social networking system provides a feed (e.g., a news feed) to users in response to requests from users. The feed includes feed stories comprising content such as text, images, and videos. An original broadcast feed story is a feed story that includes original content posted by a user via the social networking system, for example, a video captured by the user using a camera and uploaded to the social networking system or a new text post posted by the user. In response to a request for feed from a user, the social networking system determines a likelihood of the user posting an original broadcast feed story in that session. The social networking system determines the likelihood of the user posting an original broadcast feed story using an original broadcast post model. Users of a social networking system are more likely to post original broadcast feed stories in certain contexts and less likely to post original broadcast feed stories in other contexts. For example, a user at home may prefer to post original broadcast feed stories and may avoid posting original broadcast feed stories at work.

A user is more likely to post original broadcast feed stories when the user sees original broadcast feed stories from other connected users. If the social networking system determines that the likelihood of the user posting an original broadcast feed story is higher than a threshold, the social networking system encourages the user to post an original broadcast feed story by providing a feed to the user in which original broadcast feed stories from other users are boosted in rank compared to a corresponding feed presented to the user if the likelihood of the user posting the original broadcast feed story was less than the threshold value.

In an embodiment, the social networking system uses a machine learning based model to determine the likelihood of the user posting an original broadcast feed story in a session. The social networking system extracts a feature vector for providing as input to the model. In various embodiments, the feature vector includes features describing the user request, for example, the time of day of the request, features describing the client device used to send the request, features describing the user profile of the user, and so on.

BRIEF DESCRIPTION OF THE DRAWINGS

Figure (FIG.) 1 is a diagram of a system environment for generating a feed for users of a social networking system, according to one embodiment.

Figure 1:
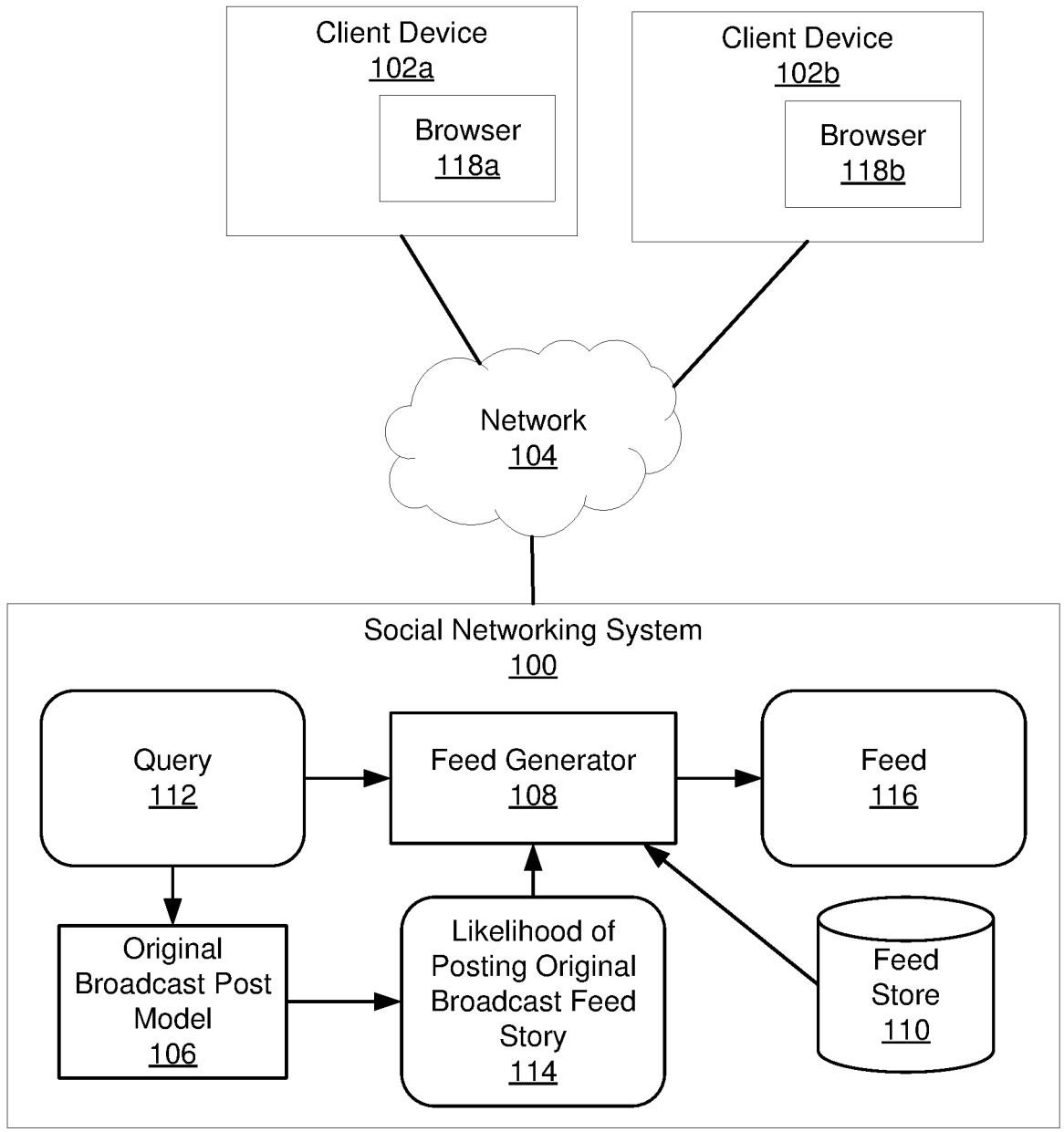

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A feed is a set of feed stories provided to a user during a given session of the user with the social networking system. Feed stories contain social information of interest to a user. A feed may include one or more original broadcast feed stories. An original broadcast feed story is a feed story that describes an original content that is provided by the user and posted in the social networking system. An original broadcast is a content item comprising one or more of text, photos, or videos that were provided to the social networking system by the user. For example, a user may capture an image or a video with a camera and upload the image or video to the social networking system via a user interface and post the image/video as an original broadcast story to a plurality of other users connected to the user via the social networking system. Alternatively, the user may enter a new story, for example, via a text input widget of a user interface of a client device used to interact with the social networking system, such as an internet browser. The user may also enter a text story using a particular client application that allows users to edit text and store it in the storage of the client device. The user may subsequently upload the text story via the user interface of the social networking system, for example, using a document upload widget, or using a text input widget that allows the user to copy the text from one client application and paste it in another client application. As such, a non-original broadcast does not include original content provided by the user that is posted to the social networking system. For example, a non-original broadcast may represent a user interaction with content previously provided by another user or an external content provider, such as one user sharing content previously posted by another user to the social networking system.

A session of a user with the social networking system comprises an initial request from user sent to the social networking system via a client device, resulting in the social networking system providing a feed comprising feed stories to the client device. A feed comprises a sequence of feed stories. The session may further comprise interactions between the client device and the social networking system, for example, subsequent requests from the user for additional feed or the user sending a request for posting content to the social networking system. A request for a feed may also be referred to herein as a "query." During a session, a user may send a request via a client device, for example, when a user connects to the social networking system via a user interface of a client application. Additionally, the client device may send subsequent requests for feed as the user continues to scroll through the feed presented via the user interface and the user reaches close to the end of the feed presently displayed via the user interface.

To maintain user interest, the social networking system determines whether a particular user is interested in posting original broadcast feed stories to the social networking system during a session. Specifically, the social networking system determines a likelihood of a user posting an original broadcast feed story during the session. For example, a user may be more likely to post original broadcast feed stories in certain contexts and less likely to post original broadcast feed stories in other contexts. A user may be more likely to post original broadcast feed stories when the user sees original broadcast feed stories from other connected users. If the likelihood of the user posting an original broadcast feed story is above a threshold, the social networking system may encourage the user to post an original broadcast feed story by displaying original broadcast feed stories posted by other users (e.g., connections of the user) to the user in a feed provided to the user. Specifically, the feed may contain more original broadcast feed stories posted by other users or the original broadcast feed stories posted by other users may be ranked higher in the feed than a feed provided to the user if the likelihood was below the threshold.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a" and/or "102b" in the figures).

System Overview

Figure (FIG. 1 is a diagram of a system environment for generating a feed 116 for users of a social networking system 100, according to one embodiment. Users' client devices 102 interact with the social networking system 100 via a network 104 to request and receive feed stories. A client device 102 includes a client application, for example, a browser 118. The social networking system 100 includes an original broadcast post model 106, a feed generator 108, a feed store 110, a query 112, a likelihood of posting an original broadcast feed story 114, and a feed 116. Some embodiments of the social networking system 100 have different and/or other modules than the ones described herein. The functions can be distributed among the modules in a different manner than described in FIG. 1.

The client devices 102 allow users to communicate and interact via the network 104 with the social networking system 100. Specifically, the client devices 102 transmit and receive data from the social networking system 100 relating to feed stories. The data may be queries 112 or generated feeds 116. The client devices 102 are computing systems capable of receiving user input as well as transmitting and/or receiving data via the network 104. The client devices 102 may contain location sensors that detect the geographical location of the device, such as a global positioning system (GPS). The client devices 102 may also run applications and/or browsers 118, 119 that allow the client devices 102 to specifically communicate with the social networking system 100. Examples of client devices 102 include desktops, laptops, smartphones, tablets, etc.

The interactions between client devices 102 and the social networking system 100 are typically performed via a network 104, for example, via the internet. The network 104 enables communications between the client devices 102 and the social networking system 100. In one embodiment, the network 104 uses standard communications technologies and/or protocols. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 104 can also include links to other networks such as the Internet.

The social networking system 100 allows users to communicate or otherwise interact with each other and access content. To do this, the social networking system 100 generates one or more feeds 116 in response to one or more queries 112 sent from client devices 102, and sends the feeds 116 to the client devices 102 associated with the queries 112. The social networking system 100 may perform other actions and include other modules, some of which are described in FIG. 3.

The query 112 is a request from a client device 102 for a feed 116 from the social networking system 100. The query 112 is received by the social networking system 100 and provided to the original broadcast post model 106 and feed generator 108, among other possible modules, to be received and analyzed. Associated with each query 112 are features that describe the query 112, the user associated with the query 112, and the social networking system 100. These features are extracted by the feature extraction module 320 (described with reference to FIG. 3), and are referred to as "extracted features." The extracted features include, user level features, query level features, features describing the client device, features describing available feed stories, and other types of features. Examples of user level features include user demographics, such as age, sex, language, ethnicity, and so on. Examples of query level features include time of day that the request was received, location of the client device sending the request (for example, work location vs. home location), and a type of client device (for example, a mobile phone, a laptop, or a desktop computer). Examples of features describing the client device include: a type of client device, for example, if the client device is a mobile phone, a laptop, or a desktop computer; and a type of client application used to send the request, for example, a mobile application or a web browser. Examples of features describing available feed stories include a total number of feed stories available for the user at the time of the request, a number of feed stories already viewed by the user, during a session, at the time of the request, and so on.

Upon receiving the query 112 from a user via a client device, the original broadcast post model 106 determines the likelihood of the user posting an original broadcast feed story 114 during the session associated with the query 112. Depending upon the likelihood of posting an original broadcast feed story 114, the feed generator 108 may adjust the order of feed stories in the feed 116 or change the feed stories in the feed 116. For example, if the likelihood of posting an original broadcast feed story 114 is above a threshold, the feed generator 108 increases the ranking of original broadcast feed stories in the feed 116 so that the user views more original broadcast feed stories.

The original broadcast post model 106 determines the likelihood of posting an original broadcast feed story 114 based on the extracted features, in response to the received query 112. Specifically, the original broadcast post model 106 receives a feature vector characterizing the extracted features (including, at least a feature specifying the time the query 112 was received). In an embodiment, the original broadcast post model 106 determines a weighted aggregate value representing the likelihood of posting an original broadcast feed story 114 based on the features in a feature vector. In an alternate embodiment, the original broadcast post model 106 is a machine learning model trained used information describing past sessions. The information describing a past session includes a past request for feed, feed sent to the target user in response to the request, and information indicating whether the user posted an original broadcast feed story after viewing one or more of the feeds. If the user posted an original broadcast feed story after viewing one or more of the feeds, the information describing that past session may include the original broadcast feed story posted.

The feed generator 108 generates a feed 116 in response to the received query 112. Specifically, upon receiving the query 112, the feed generator 108 selects a set of feed stories from the feed store 110 to generate a feed 116 including original broadcast feed stories if available and non-original broadcast feed stories. The feed generator 108 also receives the likelihood of posting an original broadcast feed story 114 from the original broadcast post model 106 and may rank the feed stories in the feed 116 according to the likelihood of posting an original broadcast feed story 114. For example, if the likelihood of the user posting an original broadcast feed story is above a threshold value, the feed generator 108 boosts the rankings of any original broadcast feed stories in the feed, so as to provide examples of original broadcast feed stories to the user, thereby encouraging the user to post an original broadcast feed story. Upon generating the feed 116, the feed generator 108 sends the generated feed 116 to the client device 102 that sent the query 112.

The feed store 110 stores feed stories for generating a feed 116. In an embodiment, the story generator 300 (described with reference to FIG. 3) generates feed stories and stores the feed stories in the feed store 110. The feed store 110 may also store feed stories from external content providers or other users. In addition to storing feed stories, the feed store 110 may link various objects related to the stories. Each feed story stored in the feed store 110 may be associated with other entities in the social networking system 100. For example, the feed store 110 may include a feed story associated with one or more users that performed an action described in the feed story in the social networking system 100. For example, if the feed story describes a comment posted by Dean on a video posted by Woodie, both Dean and Woodie can be associated to the feed story, and these relations are recorded in the feed store 110.

The feed 116 is a set of feed stories or a sequence of feed stories provided to a user via the user's client device 102 during a given session of the user with the social networking system 100. A sequence of feed stories is an ordered set of feed stories such that the feed stories are presented via a client device in the order specified by the sequence. The feed 116 is generated by the feed generator 108 and includes feed stories stored in the feed store 110. The feed 116 may contain a set of feed stories for each query 112. The feed 116 can be adjusted or ranked according to the likelihood of posting an original broadcast feed story 114, and may be different for every received query 112. An example of a feed 116 adjusted due to the likelihood of posting original broadcast feed story 114 being above a threshold value may be seen in FIG. 2.

Example Feeds

Figure 2:
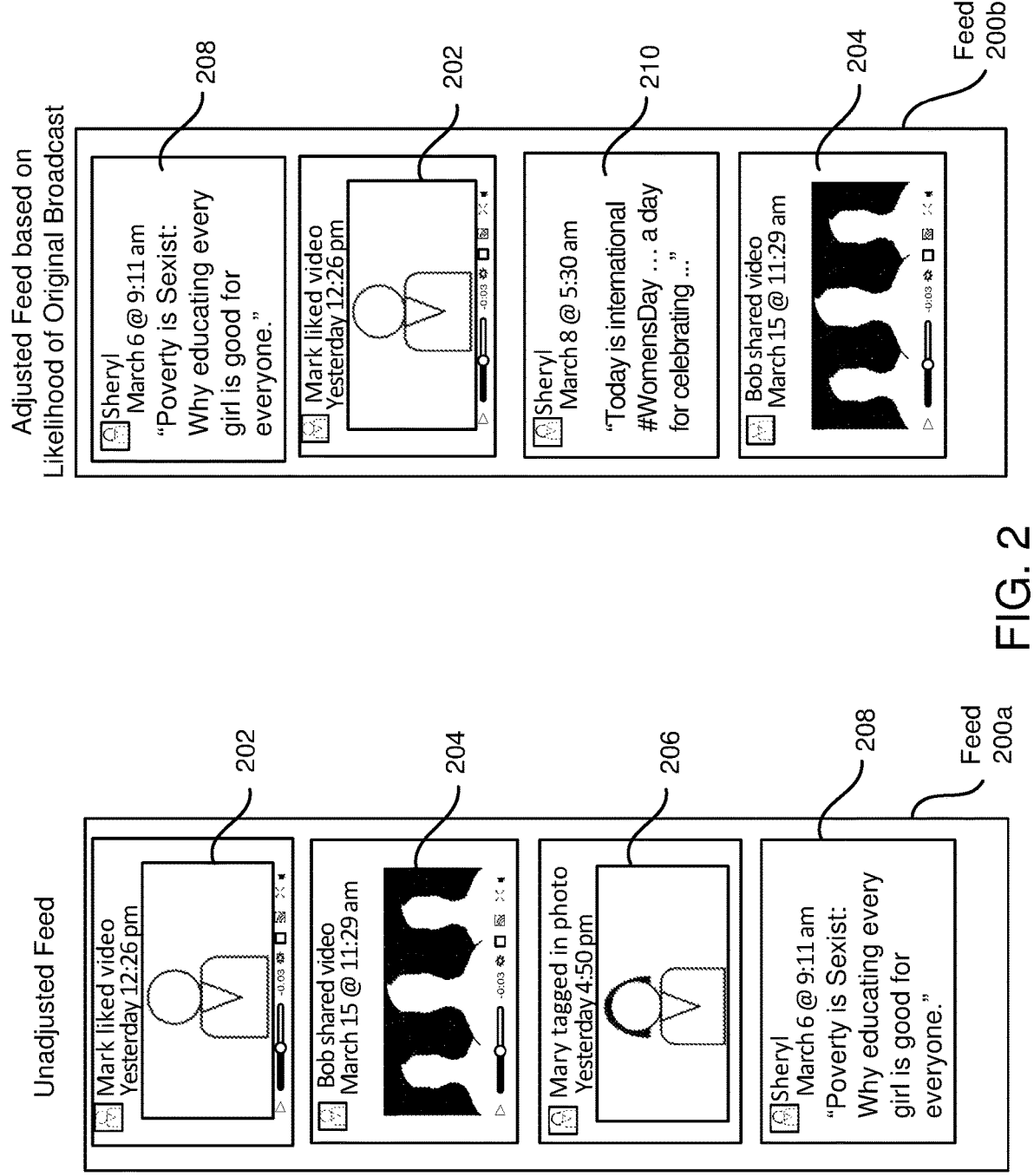
FIG. 2 illustrates example feeds generated by the social networking system, according to one embodiment.

FIG. 2 illustrates example feeds 200 generated by the social networking system 100, according to one embodiment. Both feeds 200 were generated by the feed generator 108. The feeds 200 include example non-original broadcast feed stories 202-206 and example original broadcast feed stories 208, 210. The feeds 200 may include more or fewer feed stories.

While displayed in the feeds 200, the feed stories 202-210 are stored in the feed store 110. The feed stories 202-210 contain social information of interest to a user of a client device 102. The feed stories 202-210 may contain images, text, and videos, and the feed stories may contain content received from external content providers or from users.

Original broadcast stories 208, 210 contain new content provided by a user. This can include text, video, and photos provided by the user. For example, original broadcast stories 208, 210 include text drafted by Sheryl, the user who posted the feed stories 208, 210. In another example, an original broadcast story includes photos provided by the user.

Non-original broadcast stories 202-206 do not contain new or original content (e.g., text, videos, or photos) provided by the user posting the feed story. These stories are associated with content that was previously provided by a user of the social networking system. For example, a user may re-share a content item that was previously posted by a user to the user's connections in the social networking system. As another example, feed story 202 includes a user (Mark) "liking" a video posted by another user (not Mark). In another example, feed story 204 includes a user (Bob) "sharing" a video provided by another user (not Bob).

Feed 200a is an example generated feed 116 that is generated without regard for ranking original broadcast feed stories in relation to non-original broadcast feed stories. For example, the likelihood of posting an original broadcast feed story 114 may be below a threshold. As a result, the feed generator 108 creates a feed 200a with feed stories in an arbitrary order or according to other ordering policies enforced by the social networking system 100. For example, the user may receive a feed 200a that contains no or a small number of original broadcast feed stories. This example is illustrated in feed 200a which contains three consecutive non-original broadcast feed stories 202-206 followed by original broadcast feed story 208. In an alternate example, the feed 200a may contain any number of original broadcast feed stories and non-original broadcast feed stories with little or no relationship between the ranking of the original broadcast and non-original broadcast feed stories.

Feed 200b is an example generated feed 116 that is generated when the likelihood of posting an original broadcast feed story 114 is above a threshold value. Accordingly, the feed stories 202-210 of the feed 200b are ranked such that the original broadcast feed stories 208, 210 are ranked higher in the feed 200b compared to the corresponding feed 200a. This may be a result of the feed generator 108 ranking original broadcast feed stories 208, 210 higher than non-original broadcast feed stories 202-206 and/or increasing the number of original broadcast feed stories 208, 210 in the feed 200*b*. Accordingly, in feed 200*b* more original broadcast feed stories 208, 210 are present than in feed 200*a* and the original broadcast feed stories 208, 210 are ranked higher than the non-original broadcast feed stories 202, 204. This ranking scheme may be the only ranking policy used to rank the feed 200*b* or may be one of many compatible ranking schemes used by the social networking system.

In an alternate example, the feed generator 108 does not generate a feed 116 until the feed generator 108 determines whether the likelihood of posting original broadcast feed story 114 is above or below the threshold. For example, the feed generator 108 generates the feed 200*b* by selecting the feed stories 202-210 from the feed store 110 after determining the likelihood of posting an original broadcast feed story 114 is above the threshold.

Social Networking System

Figure 3:
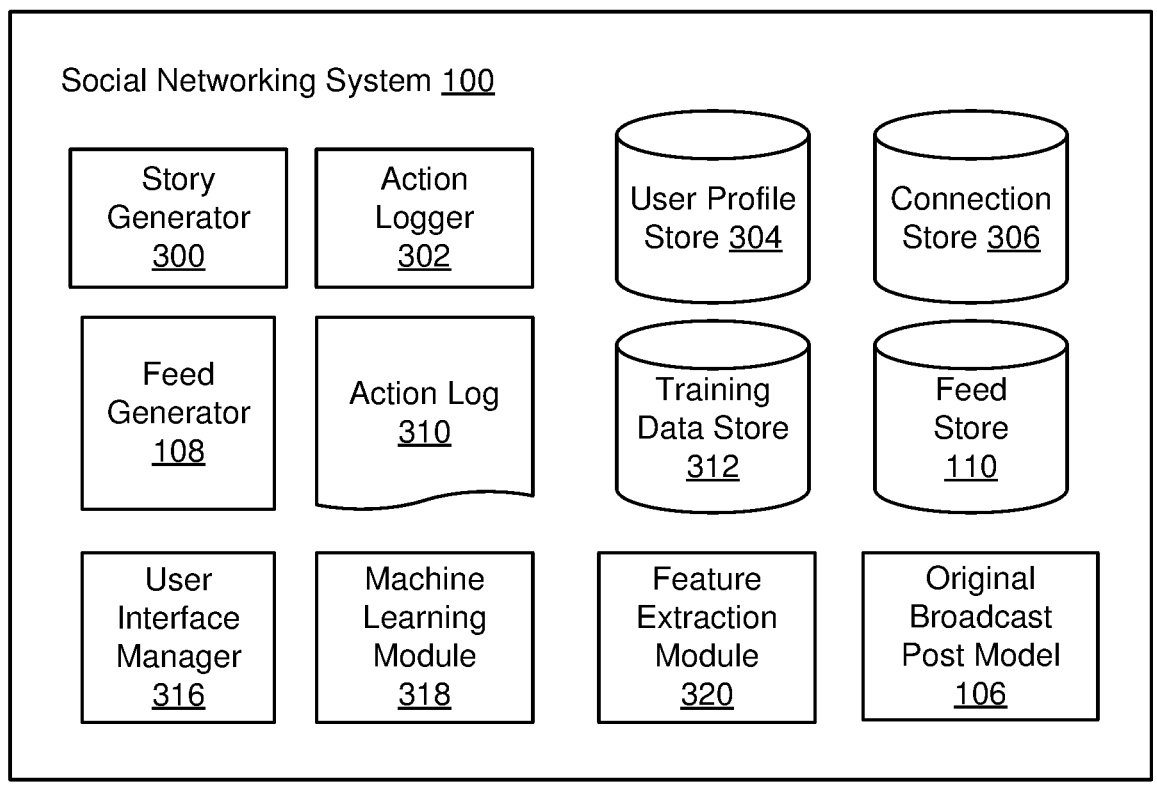
FIG. 3 is a diagram of the system architecture of the social networking system, according to one embodiment.

FIG. 3 is a diagram of the system architecture of the social networking system 100 within the environment of FIG. 1, according to one embodiment. The social networking system 100 includes, among other components, a story generator 300, an action logger 302, user profile store 304, connection store 306, action log 310, training data store 312, user interface manager 316, machine learning module 318, feature extraction module 320, feed store 110, original broadcast post model 106, and feed generator 108. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The user interface manager 316 allows users of the social networking system 100 to interact with the social networking system 100 and presents social information of interest to a user. For example, the user interface manager 316 may present an interface to a client device 102 (to be rendered by a browser 118) that includes a feed 116 that contains feed stories from the feed store 110. The feed 116 may contain a number of original broadcast feed stories according to the likelihood of posting an original broadcast feed story 114 determined by the original broadcast post model 106.

The social networking system 100 stores user profile objects in the user profile store 304. The information stored in user profile store 304 describes the users of the social networking system 100, including biographic, demographic, and other types of descriptive information, such as age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 304 may store other types of information provided by the user, for example, images, videos, documents, likes indicated by the user, comments, status updates, recommendations of images, videos, or uniform resource locator (URL) links, and the likes. Images of users may be tagged with the identification information of the appropriate users displayed in an image.

The connection store 306 stores data describing the connections between different users of the social networking system 100. The connections are defined by users, allowing users to specify their relationships with other users. For example, the connections allow users to generate relationships with other users that parallel the users' real-life relationships, such as friends, co-workers, partners, and so forth. In some embodiments, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Dean and Woodie are both connected to each other in the social networking system 100, Dean and Woodie, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The action logger 302 is capable of receiving communications about user actions on and/or off the social networking system 100. The action logger 302 populates the action log 310 with information about user actions to track them. When a user performs an action using the social networking system 100, the action logger 302 adds an entry for that action to the action log 310. Any action that a particular user takes with respect to another user is associated with each user's profile, through information maintained in a database or other data repository, such as the action log 310. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

The story generator 300 generates feed stories for presentation to users of the social networking system 100. In an embodiment, the story generator 300 analyzes information stored in the action log 310, user profile store 304, and connection store 306 to identify information useful for generating feed stories. This information includes text, images, and videos. The story generator 300 identifies actions stored in the action log 310 that are likely to be of interest to viewers and extracts information describing these actions from the action log 310, user profile store 304, and/or connection store 306 to generate stories. In some embodiments, the story generator 300 obtains information describing actions from other modules, for example, from the action logger 302, the user interface manager 316, external content providers, and/or other run time modules that implement functionality for performing different types of actions. For example, if a user uploads an image to the social networking system 100, the module executing the code for uploading the image informs the story generator 300 of the action so that the story generator 300 can generate a feed story describing the action.

The feed store 110 stores feed stories generated by the story generator 300. The feed store 110 may also link various objects related to the stories. Each feed story stored in the feed store 110 can be associated with other entities in the social networking system 100. For example, a feed story may be associated with one or more users that performed an action described in the feed story in the social networking system 100. For example, if the feed story describes a comment posted by Dean on a video posted by Woodie, both Dean and Woodie can be associated with the feed story. As another example, a story describing a comment posted by a user in response to another user's wall post may be associated with both the user who posted the message on the wall and the user who posted the comment.

The feed generator 108, determines and ranks the feed stories, stored in the feed store 110, to be presented to a user and provides the stories selected for presentation to the user interface manager 316. The user interface manager 316 presents the selected feed stories to the browser 118, 119 on a client device 102. In response to a query 112, the feed generator 108 determines and ranks a set of feed stories for presentation to the user based on associations between the feed stories and the user. These associations are determined based on various factors including, whether the feed story describes a user of the social networking system 100 that is connected to the user, whether the user previously accessed information describing an entity represented in the social networking system 100 that is described in the feed story, whether the user interacted with another feed story that is related to the current feed story, and the like. This information may be found in the action log 310, user profile store 304, connection store 306, and/or the feed store 110. The feed generator 108 may also select feed stories including actions performed by the user associated with the query.

The feed generator 108 also receives the likelihood of posting an original broadcast feed story 114 from the original broadcast post model 106 and determines whether the likelihood of posting an original broadcast feed story 114 is above a threshold. Depending upon the relation between likelihood of posting an original broadcast feed story 114 and the threshold (e.g., above or below the threshold), the feed generator 108 can adjust the order or change the feed stories in the feed 116. For example, after determining the relation between likelihood of posting an original broadcast feed story 114 and the threshold, the feed generator 108 ranks the feed stories in the feed 116 or, if already ranked, re-ranks the feed stories in the feed 116. In another example, the feed generator 108 adds or subtracts original broadcast feed stories to the feed 116 after determining the relation between likelihood of posting an original broadcast feed story 114 and the threshold.

The original broadcast post model 106 accepts the extracted features as input and determines the likelihood of posting an original broadcast feed story 114 based on the extracted features. Specifically, upon receiving a query 112 from a client device 102 of a user, the original broadcast post model 106 receives the extracted features from the feature extraction module 320 and determines a score indicative of a likelihood of a user posting an original broadcast feed story based on extracted feature scores, each extracted feature score representing a value of an extracted feature. In one embodiment, an original broadcast post model 106 is trained for each user. In other embodiments, an original broadcast post model 106 is trained for each set of users having a particular set of user attribute values, for example, users satisfying certain demographic attributes.

In an embodiment, the original broadcast post model 106 comprises weights for feature scores corresponding to various features extracted by the feature extraction module 320 and instructions for determining a weighted aggregate value based on the weights and a feature vector. The original broadcast post model 106 determines the likelihood of posting an original broadcast feed story 114 as a weighted aggregate value of feature scores. The weights are predetermined constant values or configurable values. The weights may be provided by a user, for example, an expert user who has domain knowledge for determining weights of various extracted features. The set of weights may be different for each user of the social networking system 100.

In another embodiment, the original broadcast post model 106 is a machine learning based model trained by the machine learning module 318. The machine learning original broadcast post model 106 may be unique for each user of the social networking system. The original broadcast post model 106 may be a tree-based model, a model based on kernel methods, neural networks, splines, or an ensemble of one or more of these techniques. In this embodiment, the machine learning module 318 may determine weights of various extracted features based on training data in the training data store 312. In this embodiment, the machine learning module 318 may use the content from the training data store 312 and extracted features from the feature extraction module 320 to train the original broadcast post model 106. For example, the original broadcast post model 106 may be trained using positive and negative examples from historical data stored in the training data store 312. After the original broadcast post model 106 is trained, the weights associated with various extracted features are stored. Based upon new data added to the historical data, the original broadcast post model 106 may be retrained. Upon receiving a query 112, the original broadcast post model 106 determines a likelihood of posting an original broadcast feed story 114 for the query 112.

The training data store 312 contains historical data used by the machine learning module 318 to train the original broadcast post model 106. The historical data includes past queries 112, extracted features of each query 112, feeds 116 presented to the user in response to the queries 112, and the user's response to the feeds 116. In some embodiments, the training data store 312 also contains user data of the user, similar to the user data stored in the user profile store 304. The historical data may be divided into two groups, positive and negative examples. A positive example includes a past session in which a feed was provided to the user in response to a query 112 and the user posted an original broadcast feed story. A negative example includes a past session in which a feed was provided to the user in response to a query 112 for which the user did not post an original broadcast feed story.

The feature extraction module 320 determines the extracted features associated with the received query 112 and provides the extracted features to the original broadcast post model 106. For example, after determining the extracted features, the feature extraction module 320 determines a feature vector characterizing the extracted feature and sends the feature vector to the original broadcast model 106. The extracted features can include features describing the query 112 and features describing the user associated with the query 112. Additionally, the feature extraction module 320 extracts features relating to past queries 112 and stores them in the training data store 312.

A feature may describe the time of day that the query 112 was received by the social networking system 100 or sent from the client device 102. A user may prefer posting original broadcast feed stories at a particular time of day and may dislike posting original broadcast feed stories at another time of day. For example, the user may prefer posting original broadcast feed stories during evening but may dislike posting original broadcast feed stories during day time.

A feature may describe the day of the week, month, and/or year that the query 112 was received by the social networking system 100 or sent from the client device 102. A user may prefer posting original broadcast feed stories on particular days and may dislike posting original broadcast feed stories on other days. For example, a user posts more original broadcast feed stories on weekends and less during weekdays.

A feature may describe the type of client device 102 that sent the query 112. A user may prefer posting original broadcast feed stories on certain client devices 102 (e.g., mobile, personal computer, etc.) but may dislike posting original broadcast feed stories on other client devices 102 (e.g., mobile, smartphone, tablet, etc.).

A feature may describe the location of the client device 102 of the user. The social networking system 100 may detect the location of the client device 102, for example, based on a GPS device of the client device 102. A user may prefer posting original broadcast feed stories at certain locations but dislike posting original broadcast feed stories in other locations. For example, a user may post more original broadcast feed stories at home compared to work.

A feature may describe the quality of the network 104 connection between the social networking system 100 and the client device 102 that sent the query 112. If network access is slow at the client device 102, a user may prefer to post fewer original broadcast feed stories.

A feature may describe the application used to send the query 112. A user may prefer to post original broadcast feed stories using a particular application (e.g., mobile application) but prefer to post less original broadcast feed stories using another application (e.g., browser).

In an embodiment, the feature extraction module 320 extracts features describing the user. These include user profile attributes stored in the user profile store 304, for example, age, gender, language, ethnicity, etc. Additionally, a user may have an affinity for posting original broadcast feed stories dependent upon the number of previously posted original broadcast feed stories. For example, a user may prefer to post more or less original broadcast feed stories after posting a certain number of original broadcast feed stories.

The extracted features may also include features describing the inventory of feed stories available in the feed store 110 for the user at the time the query 112 was received from the user. For example, a feature may describe a number of available original broadcast feed stories for the user. The social networking system 100 may add more or less original broadcast feed stories depending on the availability of original broadcast feed stories in the feed store 110. For example, if the feed store 110 contains a high number of original broadcast feed stories, the social networking system 100 may display more original broadcast feed stores compared to a low number of original broadcast feed stories available in the feed store 110.

Process for Training the Model

Figure 4:
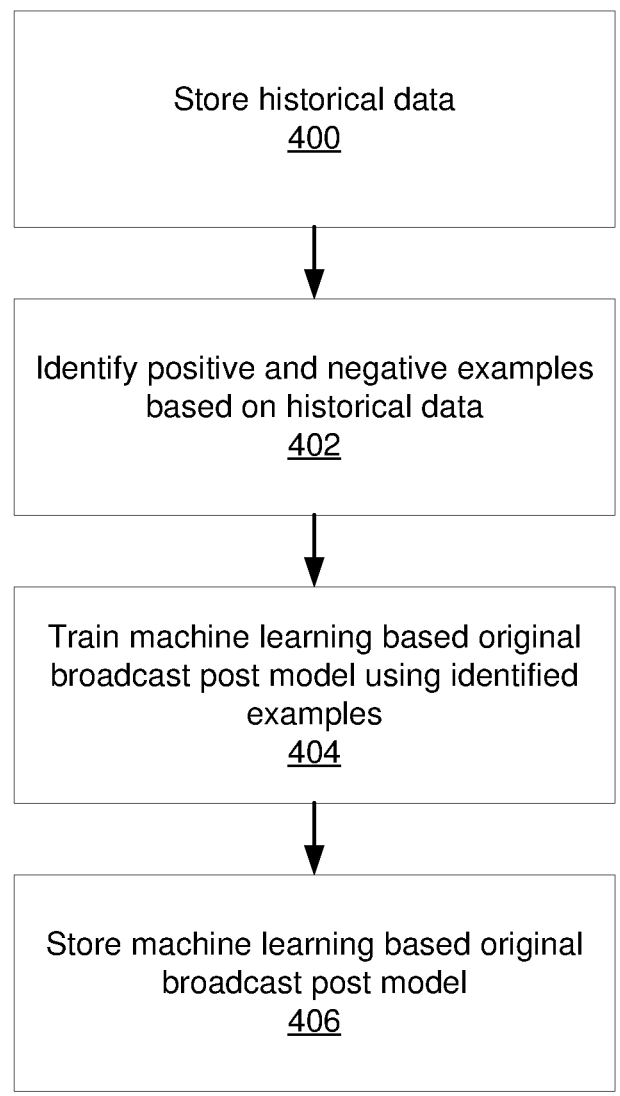
FIG. 4 is a flowchart of the process for training the original broadcast post model used for determining a likelihood of a user posting an original broadcast feed story, according to one embodiment.

FIG. 4 is a flowchart of the process for training the original broadcast post model 106 using machine learning techniques, according to one embodiment. The process may include different or additional steps than those described in conjunction with FIG. 4. The process may perform steps in different orders than the order described in conjunction with FIG. 4.

For each query 112, the original broadcast post model 106 is trained to determine a likelihood of posting an original broadcast feed story 114. The original broadcast post model 106 uses query 112 specific extracted features as well as user specific extracted features as input to determine the likelihood of posting an original broadcast feed story 114 for a given query 112. In an embodiment, the original broadcast post model 106 receives a feature vector, characterizing the extracted features, as input. As such, the original broadcast post model 106 is trained for each user and can change over time if a user's original broadcast feed story posting preferences change.

The original broadcast post model 106 is trained by the machine learning module 318, using a set of historical data. The historical data is stored 400 in the training data store 312. The training data store 312 may have a set of historical data for each user. The historical data includes past queries 112, extracted features of the past queries 112 determined by the feature extraction module 320, feed stories included in feeds 116 sent to the target user in response to the queries 112, and user posts (or the lack thereof) of original broadcast feed stories in response to viewing the feeds 116.

The machine learning module 318 identifies 402 positive and negative examples in the set of historical data in the training data store 312. In some embodiments, after an example is identified as positive or negative, the identification is stored in the training data store 312 for the machine learning module 318.

A positive example includes a session comprising a past query 112 for the user posted an original broadcast feed story during the session. A positive example may also include a session in which the feed 116 contained an increased number of original broadcast feed stories and the user posting one or more original broadcast feed stories. A negative example includes a session comprising a past query 112 for which the user did not post an original broadcast feed story during the session. A negative example also includes a past query 112 for which the user did not post an original broadcast feed story.

The machine learning module 318 trains 404 the original broadcast post model 106 using machine learning techniques, using the previously identified examples. The original broadcast post model 106 is trained to determine a likelihood of posting an original broadcast feed story 114 for a received query 112. In some embodiments, the machine learning module 318 determines weights of various extracted features based on the training data in the training data store 312. In some embodiments, the machine learning module 318 determines a feature vector for each set of extracted features associated with a query 112, and uses the feature vectors associated with each identified example to train the original broadcast post model 106.

The machine learned original broadcast post model 106 is stored 406 for future use. The original broadcast post model 106 comprises the specific weights for extracted features input to the original broadcast post model 106 that are obtained as a result of training. In response to a new query 112, the original broadcast post model 106 determines the likelihood of posting an original broadcast feed story 114 for the new query 112. The process of FIG. 4 may be repeated any number of times.

Process for Generating Feed Using the Model

Figure 5:
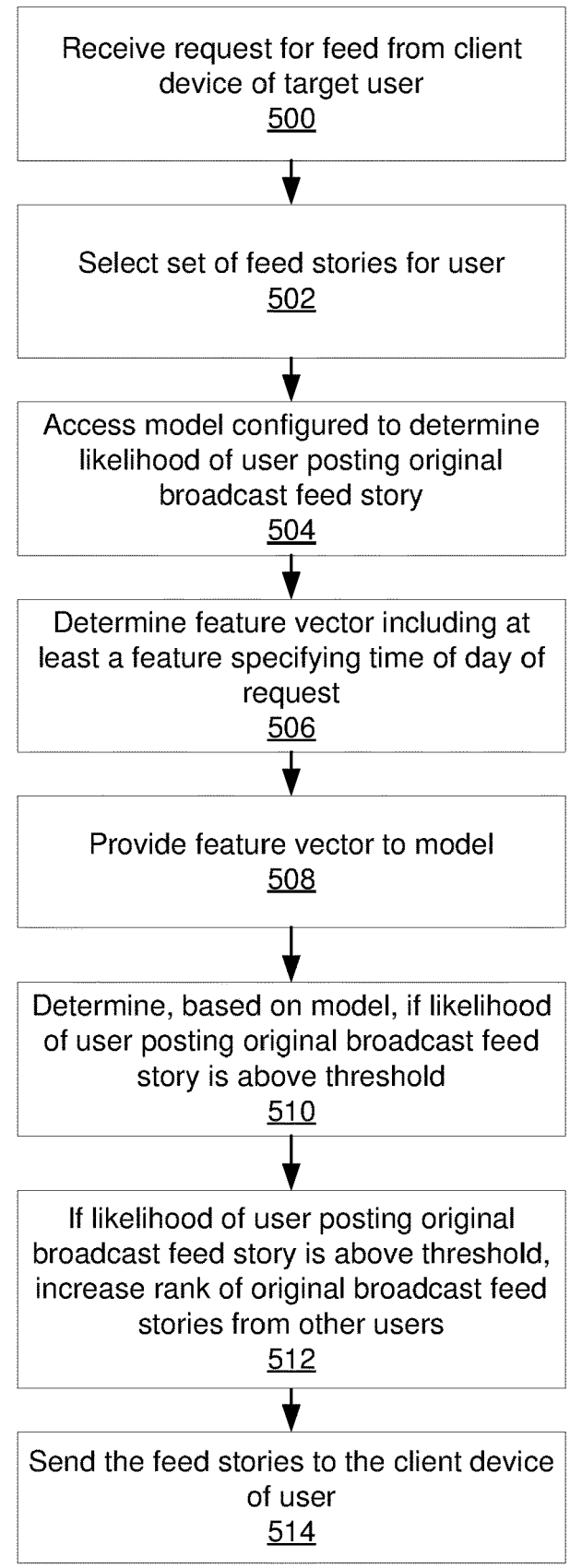
FIG. 5 is a flowchart of the process for generating a feed based on the original broadcast post model trained as illustrated in FIG. 4, according to one embodiment.

FIG. 5 is a flowchart of the process for generating a feed 116, according to one embodiment. The process may include different or additional steps than those described in conjunction with FIG. 5. The process may perform steps in different orders than the order described in conjunction with FIG. 5.

The social networking system 100 receives 500 a query 112 from a client device 102 of a target user. In some embodiments, the social networking system 100 receives many queries 112 from a single or multiple client devices 102 where each query 112 is associated with a single user. A query 112 is a request for a feed 116. A feed 116 is a set (or sequence) of feed stories provided to a user. Feed stories contain content of interest to a user. Specifically, a feed story may contain text, images, and/or videos. A feed story may be an on original broadcast feed story or a non-original broadcast feed story. Original broadcast feed stories include new (or original) content (e.g., text, photos, and videos) provided by the user that is posted in the social networking system, while non-original broadcast feed stories do not include new (or original) content provided by the user.

In response to the query 112, the feed generator 108, selects 502 a set of feed stories to be included in a feed 116 for the user. The feed generator 108, selects feed stories stored in the feed store 110. In some embodiments, the feed generator 108 selects feed stories according to user interests and/or or user connections on the social networking system 100. The feed generator may rank the feed stories in the feed 116. In some embodiments, one or more feeds 116 are generated in response to a single query 112.

The social networking system accesses 504 the original broadcast post model 106, where the broadcast post model 106 is configured to determine a likelihood of posting an original broadcast feed story 114. The likelihood of posting an original broadcast feed story 114 indicates the likelihood of the user associated to the query 112 posting an original broadcast feed story in the social networking system 100. The original broadcast post model 106 can determine the likelihood of posting an original broadcast feed story 114 based on features of the query 112. As a result, the likelihood of posting an original broadcast feed story 114 can vary with the features of the query 112.

The feature extraction module 320 determines 506 a feature vector including at least a feature specifying time of day of request. The feature vector comprises various features extracted by the feature extraction module 320, where the extracted features can be associated with the query 112 and the user associated with the query 112. The feature vector may be a vector that quantifies each extracted feature as a number in a vector component. The extracted features include, at least, the time of day of the request. The time of day of the request may describe the time that the query 112 is received by the social networking system 100 or the time that the query 112 was sent from the client device 102.

The feature extraction module 320 provides 508 the feature vector to the original broadcast post model 106. Using the feature vector, the original broadcast post model 106 determines the likelihood of posting an original broadcast feed story 114 for the current query 112. After determining the likelihood of posting an original broadcast feed story 114, the original broadcast post model 106 may send the likelihood of posting an original broadcast feed story 114 to the feed generator 108.

The feed generator 108 determines 510 if the likelihood of posting an original broadcast feed story 114 is above a threshold. The threshold may be provided by a user, for example, an expert user who has domain knowledge. Alternatively, the threshold may be determined by the machine learning module 318 based on the examples in the training data store 312.

If the likelihood of posting an original broadcast feed story 114 is above the threshold, the feed generator 108 increases 512 the rank of the original broadcast stories in the feed 116. The feed generator 108 ranks the feed stories such that the original broadcast stories are ranked higher in the feed 116 compared to a corresponding feed 116 presented to the user where the likelihood of posting an original broadcast feed story 114 is less than the threshold value (this is referred to as "boosting the original broadcast feed stories"). In some embodiments, the feed generator 108 re-ranks the feed stories in the feed 116. In alternate embodiments, the feed generator 108 does not rank the feed stories until the relation between the likelihood of posting an original broadcast feed story 114 and the threshold is determined. In some embodiments, after the relation between the likelihood of posting an original broadcast feed story 114 and the threshold is determined, the feed generator 108 adds or subtracts original broadcast feed stories from the feed 116.

The social networking system 100 sends 514 the feed 116 to the client device 102 of the target user. The process of FIG. 5 may be repeated any number of times.

Alternative Applications

In an embodiment, the social networking system 100 is not limited to considering original broadcast feed stories. In this embodiment, the social networking system 100 (e.g., using a model similar to the original broadcast post model 106) can predict the likelihood of any type of action and then boost stories including the same type of action. For example, if the social networking system 100 determines that a user is likely to share a feed story, the social networking system 100 boosts feed stories showing users sharing feed stories. In another example, if the social networking system 100 determines that a user is likely to "like" a feed story, the social networking system 100 boosts feed stories with users "liking" the feed stories. Broadly, if the social networking system 100 determines a user is likely to perform action X, then the social networking system 100 boosts feed stories of users performing action X during that session. In this embodiment, the social networking system 100 determines likelihood scores (similar to the likelihood of posting an original broadcast feed story 114) for any of the actions that a user could perform while interacting with the social networking system 100.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a social networking system, a request for feed from a client device of a target user, wherein a feed represents a sequence of feed stories, each feed story comprising one or more of text, image, or video;
   selecting a feed to provide to the user in response to the request, the feed comprising a plurality of feed stories comprising original broadcast feed stories and non-original broadcast feed stories;
   accessing a model configured to receive an input feature vector describing the request received from the client device and determine an output indicating a likelihood of the user posting an original broadcast feed story to a set of users of the social networking system;
   determining a feature vector describing the request received from the client device, the feature vector comprising a feature specifying a time of day of the request;
   providing the feature vector as input to the model;
   determining based on the model, whether a likelihood of the user posting an original broadcast feed story to a set of users of the social networking system is above a threshold value;
   responsive to determining that the likelihood of the user posting the original broadcast feed story is greater than a threshold value, ranking the feed stories of the feed for presenting to the user such that original broadcast feed stories are ranked higher in the feed compared to a corresponding feed presented to the user responsive to the likelihood of the user posting the original broadcast feed story being less than the threshold value; and
   sending the plurality of feed stories to the client device of the target user.

2. The computer-implemented method of claim 1, wherein the model is a machine learning model trained using past requests for feeds, feeds sent to the target user in response to the past requests, and original feed broadcast stories posted by the user after viewing one or more of the feeds.

3. The computer-implemented method of claim 2, further comprising:
   storing information describing past sessions, the information describing each session comprising a past request for a feed, a feed sent to the target user in response to the past request, and an indication of whether an original broadcast feed story was posted by the user after viewing the feed;
   identifying positive and negative examples based on the information describing past sessions; and
   training the machine learning model using the positive and negative examples.

4. The computer-implemented method of claim 3, wherein a positive example represents a past session comprising a request from the user and a feed posted to the user, wherein the user posted an original broadcast feed story responsive to receiving the feed.

5. The computer-implemented method of claim 3, wherein a negative example represents a past session comprising a request from the user and a feed posted to the user, wherein the user failed to post an original broadcast feed story responsive to receiving the feed.

6. The computer-implemented method of claim 1, wherein the request is a first request, the feature vector is a first feature vector, the feed is a first feed, and the plurality of feed stories is a first plurality of feed stories, the method further comprising:
   receiving a second request for feed from the client device of the target user;
   selecting a second feed comprising a second plurality of feed stories for providing to the user in response to the request;
   determining a second feature vector describing the second request received from the user client device, the feature vector comprising a feature specifying a time of day of the second request;
   determining based on the model, a likelihood of the user posting the original broadcast feed story to a set of users of the social networking system;
   determining whether the likelihood of the user posting the original broadcast feed story to a set of users of the social networking system is above a threshold value;
   responsive to determining that the likelihood of the user posting the original broadcast feed story is below the threshold value, ranking the second feed for presenting to the user without boosting ranks of the original broadcast feed stories; and
   sending the second set of feed stories to the client device of the target user.

7. The computer-implemented method of claim 1, wherein the feature vector further comprises one or more features describing demographic attributes stored in the user profile of the user.

8. The computer-implemented method of claim 7, wherein a demographic attribute is one of: age of the user, gender of the user, or a language associated with the user.

9. The computer-implemented method of claim 1, wherein the feature vector further comprises one or more features describing a type of the client device.

10. The computer-implemented method of claim 1, wherein the feature vector further comprises a feature identifying a client application of the client device used to send the request.

11. The computer-implemented method of claim 1, wherein the feature vector further comprises a feature describing a location of the client device.

12. The computer-implemented method of claim 1, wherein the feature vector further comprises a feature representing an estimate of a number of original broadcast feed stories that are available in an inventory of original broadcast feed stories.

13. A non-transitory computer-readable storage medium comprising stored instructions for:
receiving, by a social networking system, a request for feed from a client device of a target user, wherein a feed represents a sequence of feed stories, each feed story comprising one or more of text, image, or video;
selecting a feed to provide to the user in response to the request, the feed comprising a plurality of feed stories comprising original broadcast feed stories and non-original broadcast feed stories;
accessing a model configured to receive an input feature vector describing the request received from the client device and determine an output indicating a likelihood of the user posting an original broadcast feed story to a set of users of the social networking system;
determining a feature vector describing the request received from the client device, the feature vector comprising a feature specifying a time of day of the request;
providing the feature vector as input to the model;
determining based on the model, whether a likelihood of the user posting an original broadcast feed story to a set of users of the social networking system is above a threshold value;
responsive to determining that the likelihood of the user posting the original broadcast feed story is greater than a threshold value, ranking the feed stories of the feed for presenting to the user such that original broadcast feed stories are ranked higher in the feed compared to a corresponding feed presented to the user responsive to the likelihood of the user posting the original broadcast feed story being less than the threshold value; and
sending the plurality of feed stories to the client device of the target user.

14. The non-transitory computer-readable storage medium of claim 13, wherein the model is a machine learning model, wherein the stored instructions are further for:
storing information describing past sessions, the information describing each session comprising a request for a feed, a feed sent to the target user in response to the request, and an indication of whether an original broadcast feed story was posted by the user after viewing the feed;
identifying positive and negative examples based on the information describing past sessions; and
training the machine learning model using the positive and negative examples.

15. The non-transitory computer-readable storage medium of claim 13, wherein the request is a first request, the feature vector is a first feature vector, the feed is the first feed, and the plurality of feed stories is the first plurality of feed stories, the non-transitory computer-readable storage medium further comprising stored instructions for:
receiving a second request for feed from the client device of the target user;
selecting a second feed comprising a second plurality of feed stories for providing to the user in response to the request;
determining a second feature vector describing the second request received from the user client device, the feature vector comprising a feature specifying a time of day of the second request;
determining based on the model, a likelihood of the user posting the original broadcast feed story to a set of users of the social networking system;
determining whether the likelihood of the user posting the original broadcast feed story to a set of users of the social networking system is above a threshold value;
responsive to determining that the likelihood of the user posting the original broadcast feed story is below the threshold value, ranking the second feed for presenting to the user without boosting the ranks of the original broadcast feed story; and
sending the second set of feed stories to the client device of the target user.

16. The non-transitory computer-readable storage medium of claim 13, wherein the feature vector further comprises one or more features describing demographic attributes stored in the user profile of the user.

17. The non-transitory computer-readable storage medium of claim 16, wherein a demographic attribute is one of: age of the user, gender of the user, or a language associated with the user.

18. The non-transitory computer-readable storage medium of claim 13, wherein the feature vector further comprises one or more features describing a type of the client device.

19. The non-transitory computer-readable storage medium of claim 13, wherein the feature vector further comprises a feature representing an estimate of a number of video feed stories that have not been provided to the user.

20. A computer system comprising:
a computer processor; and
a non-transitory computer-readable storage medium comprising stored instructions for:
receiving, by a social networking system, a request for feed from a client device of a target user, wherein a feed represents a sequence of feed stories, each feed story comprising one or more of text, image, or video;
selecting a feed to provide to the user in response to the request, the feed comprising a plurality of feed stories comprising original broadcast feed stories and non-original broadcast feed stories;
accessing a model configured to receive an input feature vector describing the request received from the client device and determine an output indicating a likelihood of the user posting an original broadcast feed story to a set of users of the social networking system;
determining a feature vector describing the request received from the client device, the feature vector comprising a feature specifying a time of day of the request;
providing the feature vector as input to the model;
determining based on the model, whether a likelihood of the user posting an original broadcast feed story to a set of users of the social networking system is above a threshold value;

responsive to determining that the likelihood of the user posting the original broadcast feed story is greater than a threshold value, ranking the feed stories of the feed for presenting to the user such that original broadcast feed stories are ranked higher in the feed compared to a corresponding feed presented to the user responsive to the likelihood of the user posting the original broadcast feed story being less than the threshold value; and sending the plurality of feed stories to the client device of the target user.

\* \* \* \* \*